US010445105B2

United States Patent
Wu et al.

(10) Patent No.: US 10,445,105 B2
(45) Date of Patent: Oct. 15, 2019

(54) SCHEME FOR AUTOMATICALLY CONTROLLING DONGLE DEVICE AND/OR ELECTRONIC DEVICE TO ENTER WAITING STATE OF DEVICE PAIRING IN WHICH THE DONGLE DEVICE AND THE ELECTRONIC DEVICE EXCHANGE/SHARE PAIRING INFORMATION

(71) Applicant: PixArt Imaging Inc., Hsin-Chu (TW)

(72) Inventors: Tsung-Ho Wu, Hsin-Chu (TW);
He-Jhan Jiang, Hsin-Chu (TW);
Jung-Chi Lai, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/883,034

(22) Filed: Jan. 29, 2018

(65) Prior Publication Data
US 2019/0235880 A1 Aug. 1, 2019

(51) Int. Cl.
*G06F 9/4401* (2018.01)
*G06F 13/38* (2006.01)

(52) U.S. Cl.
CPC .......... *G06F 9/4415* (2013.01); *G06F 13/385* (2013.01); *G06F 2213/0042* (2013.01); *G06F 2213/3814* (2013.01)

(58) Field of Classification Search
CPC .................................................... G06F 13/385
USPC .......................................................... 710/10
See application file for complete search history.

(56) References Cited

U.S. PATENT DOCUMENTS

| | | | |
|---|---|---|---|
| 7,913,297 B2 * | 3/2011 | Wyld | H04L 63/08 726/5 |
| 8,811,900 B2 | 8/2014 | Kirsch | |
| 2006/0034231 A1 * | 2/2006 | Tailor | H04W 88/02 370/338 |
| 2006/0111097 A1 * | 5/2006 | Fujii | H04L 63/08 455/420 |
| 2006/0212611 A1 * | 9/2006 | Fujii | G06F 13/4282 710/16 |
| 2008/0320587 A1 * | 12/2008 | Vauclair | H04L 41/28 726/17 |
| 2010/0019920 A1 * | 1/2010 | Ketari | G08B 13/1427 340/686.6 |
| 2010/0315279 A1 * | 12/2010 | Hamai | G08C 17/02 341/176 |
| 2012/0156993 A1 * | 6/2012 | Seo | G06F 13/4045 455/41.1 |
| 2012/0265623 A1 * | 10/2012 | Zhu | G06K 7/1095 705/16 |
| 2014/0233755 A1 | 8/2014 | Kim | |
| 2016/0196740 A1 * | 7/2016 | Park | G08C 17/02 340/12.28 |
| 2018/0176079 A1 * | 6/2018 | Teo | H04L 29/08 |

* cited by examiner

*Primary Examiner* — Paul R. Myers
(74) *Attorney, Agent, or Firm* — Winston Hsu (57) ABSTRACT

A method for controlling a dongle device to enter a waiting state of device pairing to perform automatic device pairing includes: commanding the dongle device to enter the waiting state when the dongle device is powered up, the dongle device having a storage circuit which is used for storing specific information of at least one electronic device that has been paired with the dongle device; checking the storage circuit of the dongle device; and transmitting a pairing request from the dongle device to the electronic device according to a result of checking the storage circuit.

18 Claims, 6 Drawing Sheets

SCHEME FOR AUTOMATICALLY CONTROLLING DONGLE DEVICE AND/OR ELECTRONIC DEVICE TO ENTER WAITING STATE OF DEVICE PAIRING IN WHICH THE DONGLE DEVICE AND THE ELECTRONIC DEVICE EXCHANGE/SHARE PAIRING INFORMATION

BACKGROUND OF THE INVENTION

Field of the Invention

The invention relates to a device pairing mechanism, and more particularly to an automatic device pairing process/method for automatically controlling a dongle device and electronic device(s) to enter a waiting state of device pairing in which the dongle device and the electronic device(s) exchange/share pairing information.

Generally speaking, a conventional procedure for pairing a dongle device with a portable electronic device needs to make a user/operator to manually activate an application or software and/or manually press a specific key/button to control the dongle device and portable electronic device to enter a waiting state of device pairing. It is very inconvenient for the user/operator at a factory to manually operate the conventional procedure to perform device pairing for each of a large number of dongle devices and a corresponding one of electronic devices. In addition, it is also inconvenient for a common/generic user to manually operate the conventional procedure to perform device pairing to add and pair a new peripheral device with the dongle device currently used and/or to add and pair the currently used electronic device with a new dongle device.

SUMMARY OF THE INVENTION

Therefore one of the objectives of the invention is to provide a scheme/mechanism capable of performing an automatic device pairing process for a dongle device and portable electronic device(s), to solve the above-mentioned problems.

According to embodiments of the invention, a method for controlling a dongle device to enter a waiting state of device pairing to perform automatic device pairing is disclosed. The method comprises: commanding the dongle device to enter the waiting state when the dongle device is powered up, the dongle device having a storage circuit which is used for storing specific information of at least one electronic device that has been paired with the dongle device; checking the storage circuit of the dongle device; and transmitting a pairing request from the dongle device to the electronic device according to a result of checking the storage circuit.

According to the embodiments, a dongle device is disclosed. The dongle device comprises a storage circuit and a processing circuit. The storage circuit is configured for storing specific information of at least one electronic device that has been paired with the dongle device. The processing circuit is coupled to the storage circuit and is configured for commanding the dongle device to enter a waiting state of device pairing when the dongle device is powered up, for checking the storage circuit of the dongle device, and for transmitting a pairing request from the dongle device to the electronic device according to a result of checking the storage circuit.

According to the embodiments, a method for controlling a dongle device to enter a waiting state of device pairing is disclosed. The method comprises: checking a storage circuit of the electronic device when the electronic device is powered up, the storage circuit of the electronic device being used for storing specific information of a dongle device which has been successfully paired with the electronic device; commanding the electronic device to enter the waiting state according to a result of checking the storage circuit; transmitting a pairing request from the electronic device to the dongle device according to the result of checking the storage circuit.

According to the embodiments, an electronic device is disclosed. The electronic device comprises a storage circuit and a controlling circuit. The controlling circuit is coupled to the storage circuit and is configured for checking the storage circuit when the electronic device is powered up, and for controlling the electronic device to enter the waiting state according to a result of checking the storage circuit and in the waiting state for transmitting a pairing request from the electronic device to a dongle device. The storage circuit is used for storing specific information of a dongle device which has been successfully paired with the electronic device.

According to the embodiments, a host equipment device for setting a dongle device having multiple registers used for recoding specific information of electronic device(s) that has or have been paired with the dongle device is disclosed. The host equipment device comprises a human-machine interactive interface and a control device. The human-machine interactive interface is configured for receiving an input of a user. The control device is coupled to the human-machine interactive interface and is configured for activating a specific application or software for the dongle device to configure/adjust a number of available registers to be smaller than a number of the multiple registers according to the input of the user.

According to the embodiments, it is not required and not necessary for a generic user or an operator at the factory to further activate an application/software and/or press a button/key to perform device pairing. For the user/operator, one or more electronic devices can be automatically paired with a dongle device as long as the electronic device(s) is/are move to or placed at the neighborhood of such dongle device. For the user/operator, the device pairing becomes more convenient. The automatic device pairing process can automatically pair the dongle device with electronic device(s) without requesting the user or operator to activate the device pairing function.

These and other objectives of the present invention will no doubt become obvious to those of ordinary skill in the art after reading the following detailed description of the preferred embodiment that is illustrated in the various figures and drawings.

DETAILED DESCRIPTION

The invention is to provide an automatic device pairing process/method or devices arranged to implement the process/method which is capable of controlling a dongle device and/or neighboring portable electronic device(s) to automatically enter a waiting state of device pairing in which the dongle device and neighboring portable electronic device(s) can automatically exchange pairing information/key/ID so as to establish security or dedicated link/connection later.

In the waiting state of device pairing, one device is arranged to issue/transmit a pairing request, and the other device is arranged issue/transmit a pairing response in reply to the pairing request, so as to exchange pairing information/key/ID. A neighboring electronic device may be a computer peripheral device to be paired with the dongle device and for example is an optical navigation device, optical mouse device, keyboard device, touch pad device, speaker, earphone, microphone, or another different type electronic device. By using the automatic device pairing process, when the dongle device and electronic device(s) are powered up, it is not required and not necessary for a generic user or an operator at the factory to further activate an application/software and/or press a button/key to perform device pairing. It merely needs to place or move the dongle device at the neighborhood of such electronic device. The device pairing becomes more convenient since the automatic device pairing process can automatically pair the dongle device with electronic device(s) without requesting the user or operator to activate the device pairing function. It is convenient for the user/operator at a factory to perform the automatic device pairing process for each of a large number of dongle devices and a corresponding one of electronic devices. Also, it is convenient for a common user to perform automatic device pairing process to add and pair a new peripheral device with the dongle device currently used and/or to add and pair the currently used electronic device with a new dongle device.

Figure 1:
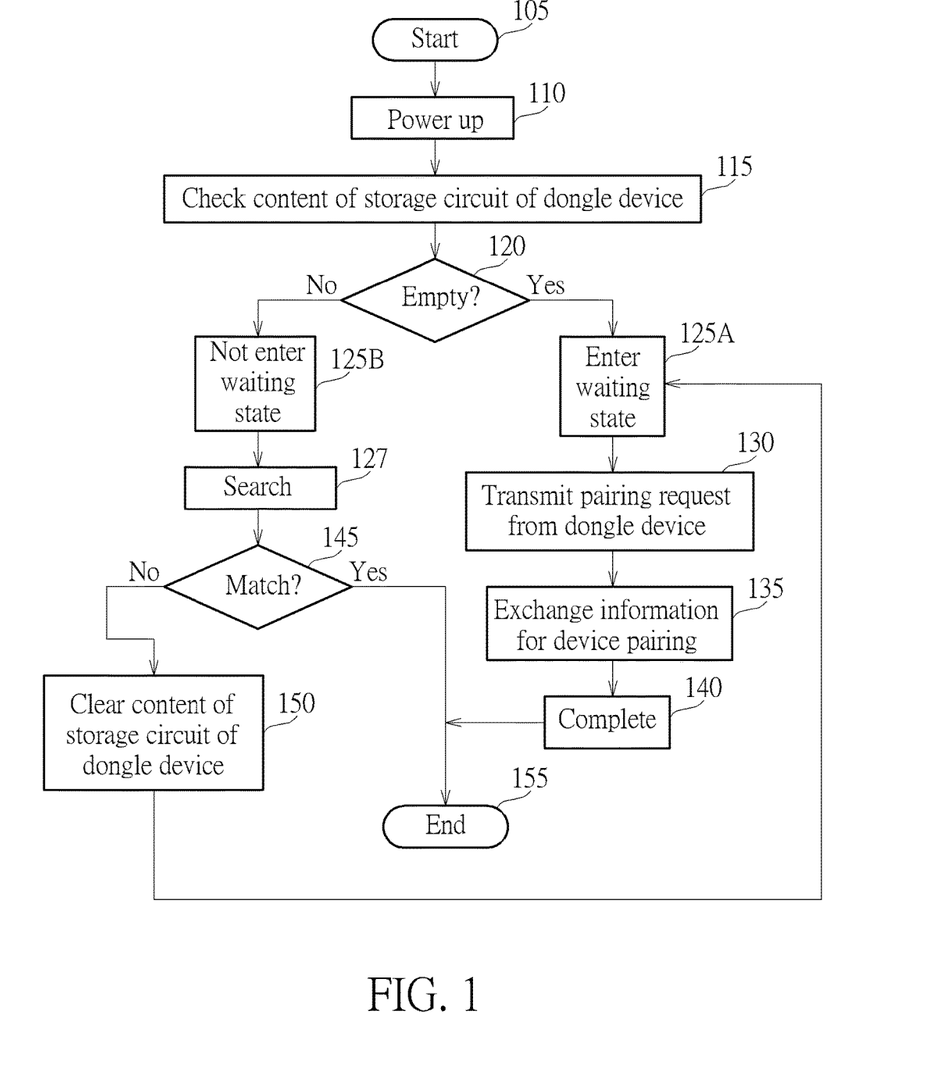
FIG. 1 is a flowchart diagram of an automatic device pairing process/method capable of controlling a dongle device and at least one electronic device to automatically enter a waiting state of device pairing according to a first embodiment of the invention.
Figure 2:
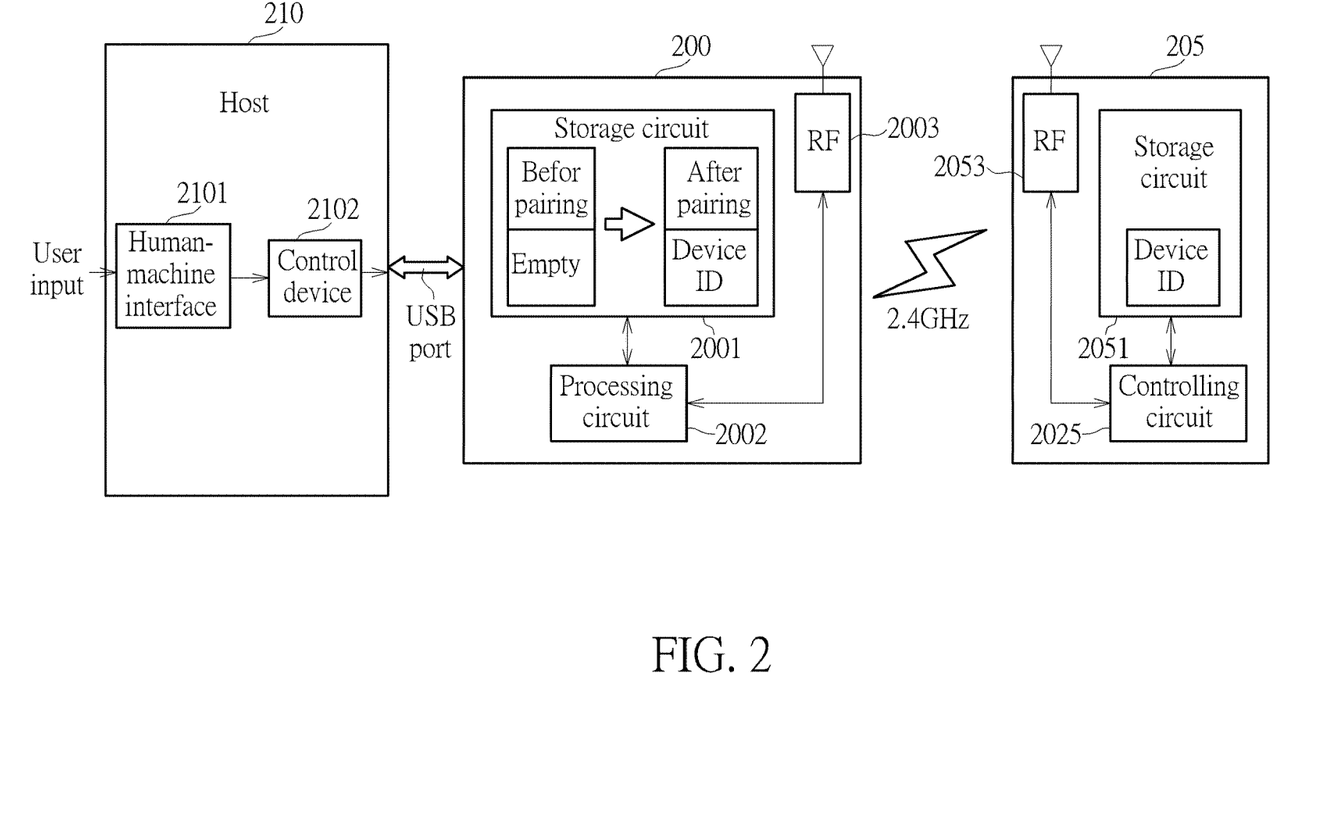
FIG. 2 is a block diagram of a dongle device and at least one electronic device according to the embodiment of FIG. 1.

Refer to FIG. 1 in conjunction with FIG. 2. FIG. 1 is a flowchart diagram of the automatic device pairing process/method for controlling a dongle device and at least one electronic device to automatically enter a waiting state of device pairing (or called a pairing state) according to a first embodiment of the invention. FIG. 2 is a block diagram of a dongle device 200 and at least one electronic device 205 according to the embodiment of FIG. 1. For simplicity, only one electronic device 205 is shown on FIG. 2 but this does not mean a limitation of the invention.

The dongle device 200 for example is a USB dongle (but not limited) which is small enough to fit into a pocket (not limited) and a user can plug it into a signal port of a host equipment device 210. In other examples, the dongle device 200 may be built in the host equipment device 210. The host equipment device 210 for example may be a testing equipment at the factory for an operator user or a personal computer for a generic user. The host equipment device 210 comprises a human-machine interactive interface 2101 and a control device such as a central processing unit 2102. The human-machine interactive interface 2101 can receive an input of a user, and the control device 2102 can issue a specific command or signal to the dongle device 200 via the signal port such as a USB port for the personal computer or via wireless communication. The dongle device 200 is designed or configured to be capable of communicating with at least one electronic device such as the device 205 via a wireless communication such as 2.4 GHz Bluetooth communication (not limited) so that a user can operate and use the electronic device 205 to control the host equipment device personal computer through the wireless communication and dongle device 200.

For example, the electronic device 205 may be a portable device such as an optical mouse device, a keyboard device, or a touch pad device (but not limited), and the user may operate the optical mouse device, keyboard device, or the touch pad device to control or move the cursor displayed on a display screen of the computer and/or perform other functions or operations. That is, the dongle device 200 is able to receive control signal(s) transmitted from one or more electronic devices. For example, the electronic devices may be wireless headphones or other electronic products, and the dongle device 200 can be arranged to receive acknowledgement signal(s) or other information/data.

Before an electronic device such as device 205 can establish a security/dedicated link connection with the dongle device 200 to exchange information/packet(s), it is necessary to pair the dongle device 200 with such the electronic device 205 successfully. If the dongle device 200 and the electronic device 205 have entered in the above-mentioned waiting state for device pairing, either the dongle device 200 or the electronic device 205 can be arranged to issue a pairing request/message to the other device to perform the device pairing process, and the other device is arranged to send back the pairing response in reply to the pairing request.

In the embodiment, the method is arranged to control the dongle device 200 and the electronic device 205 to automatically enter the waiting state for device pairing so that the device pairing can be automatically performed and completed without manually activating the function by pressing a button/key or activating an application or software. Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: Power up the dongle device 200 and electronic device 205;

Step 115: Use the dongle device 200 to check content of a storage circuit included within the dongle device 200 to generate a result such as a check resultant signal;

Step 120: Determine whether the check resultant signal indicates that the content is empty or not. If the content is empty, the flow proceeds to Step 125A, otherwise, the flow proceeds to Step 125B;

Step 125A: Control the dongle device 200 to enter the waiting state automatically;

Step 125B: Not control the dongle device 200 to enter the waiting state;

Step 127: Broadcast a generic information/message from the dongle device 200 to neighbor electronic device(s) to search for available neighbor electronic device(s) which will respond back unique message(s) in response to the generic message of the dongle device 200;

Step 130: Transmit a pairing request/message/packet from the dongle device 200 to the electronic device 205 to command the electronic device 205 to automatically enter the waiting state without activating an application or software to trigger the electronic device 205 to enter the waiting state;

Step 135: Control the dongle device 200 and electronic device 205 both in the waiting state of device pairing to exchange unique information/ID/key for device pairing;

Step 140: Complete device pairing;

Step 145: Determine whether any one responded unique message is matched with the information of content of the storage circuit; if the message is matched with the content information, the flow proceeds to Step 155, otherwise, the flow proceeds to Step 130;

Step 150: Clear the content of the storage circuit 2001; and

Step 155: End.

In practice, the dongle device 200 comprises the storage circuit 2001, a processing circuit 2002, and a transceiver 2003 (including RF circuit and antenna); the electronic device 205 comprises a storage circuit 2051, a controlling circuit 2052, and a transceiver 2053 (including RF circuit and antenna). Each of the storage circuit 2001 and storage circuit 2051 for example may have one or more registers, and each register may be configured to store/record exchanged pairing information/ID/key (the content of register is empty initially). For example, the storage circuit 2001 of dongle device 200 may have N registers and N is an integer equal to or greater than 2. For instance, N can be designed to be greater than 8. The storage circuit 2051 of electronic device 205 may have one register for reducing circuit costs (but not limited).

In Step 115, after the dongle device is powered, the processing circuit 2002 checks the contents of one or more registers included within the storage circuit 2001 to generate the check resultant signal. Before device pairing, the check resultant signal may indicate that the content of one register (or more registers) is empty. Then, the processing circuit 2002 in Step 125A controls the dongle device 200 to enter the waiting state for device pairing. In Step 130, the processing circuit 2002 controls the transceiver 2003 to transmit a pairing request/message/packet from the dongle device 200 to the electronic device 205 to command the electronic device 205 to automatically enter the waiting state without activating an application or software to trigger the electronic device 205 to enter the waiting state. In this embodiment, when the electronic device 205 is powered up in Step 110 and receives the pairing request/message/packet of Step 130, the controlling circuit 2052 of electronic device 205 is arranged to respond the pairing request/message/packet by sending the unique device identification (ID) of electronic device 205, which is recorded by one register of storage circuit 2051, from the device 205 to the dongle device 200 through the transceiver 2053 via the 2.4 GHz wireless communication. When the dongle device 200 receives such unique device ID, the storage circuit 2001 stores such information at a corresponding register. Thus, after exchanging/sharing the unique ID information, the device pairing process is automatically completed (Step 140). Later, the dongle device 200 and electronic device 205 can establish a security link/connection based on the exchanged pairing information/ID. In addition, the exchanged pairing information may be a particular/unique key generated or stored by the electronic device 205; this modification also falls within the scope of the invention.

In other situations, the dongle device 200 may have been paired with another electronic device, and the content of the register has recorded the unique device ID of such another electronic device and is not empty. Thus, the flow of FIG. 1 proceeds to Step 125B. In Step 125B, the processing circuit 2002 controls the transceiver 2003 to broadcast the generic information/message, e.g. broadcast ID, from the dongle device 200 to neighbor electronic device(s) including the device 205. Each of the neighbor electronic device(s) reports its device information such as device ID to the dongle device 200. When receiving any one reported device ID via transceiver 2003, the processing circuit 2002 determines whether the received device ID, from a particular device, matches with the device ID recorded by the register of the storage circuit 2001. If the device ID of a particular device distinct from the electronic device 205 correctly matches with the content of the register of the storage circuit 2001, the flow proceeds to Step 155, and the automatic device pairing process ends. In this situation, the dongle device 200 has found the particular device previously paired and later can be arranged to establish security link/connection with such paired electronic device. If no device IDs match with the content of the register of the storage circuit 2001, this may indicate that the user now may try to use/operate an electronic device which is not previously paired with the dongle device 200. In this embodiment, the processing circuit 2002 is arranged to clear the content of the register of the storage circuit 2001 (in Step 150), and then the flow proceeds to Step 125A to perform the automatic device pairing process again. In the embodiment, the dongle device 200 may be arranged to determine an electronic device corresponding to the first one received device ID as a paired device.

In addition, in other embodiment, the storage circuit 2001 may have one or more registers which are used for storing or recording device MAC addresses of devices have been paired with the dongle device 200. Storing device ID information is not intended to be a limitation.

Figure 3:
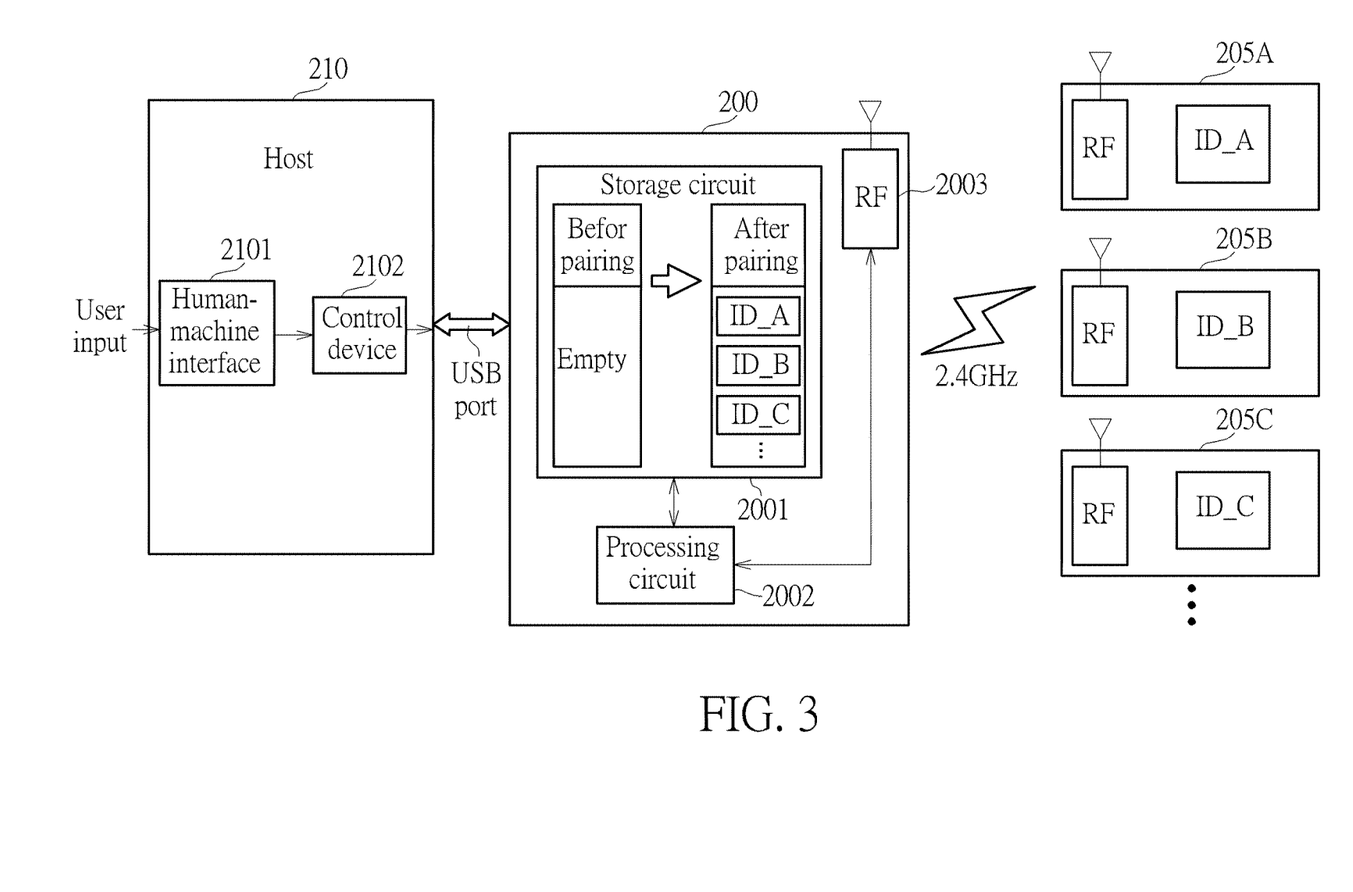
FIG. 3 is a block diagram of dongle device performing the automatic device pairing process with multiple electronic devices.

In addition, in other embodiment, the dongle device 200 can be arranged to perform the automatic device pairing process with multiple electronic devices having the same, similar, or different functions/operations when the flow of FIG. 1 proceeds to Step 125A. Refer to FIG. 3, which is a block diagram of dongle device 200 performing the automatic device pairing process with multiple electronic devices such as 205A, 205B, and 205C. As shown in FIG. 3, the storage circuit 2001 may have three or more registers which can be used for recording device ID information of distinct electronic devices having the same/similar/different functions and operations. Thus, each of the electronic devices 205A, 205B, and 205C can be arranged to respectively and individually exchange pairing information with the dongle device 200. For example, the electronic devices 205A, 205B, and 205C may be an optical mouse device, a keyboard device, and a touch pad device. The storage circuit 2001 may have three registers respectively used for storing device ID information of optical mouse device, keyboard device, and the touch pad device. Initially, the content of the three registers before pairing is empty, and the content of the three registers after pairing records device ID information ID_A, ID_B, and ID_C of the three electronic devices 205A, 205B, and 205C. This is not intended to be a limitation. The flow of FIG. 1 is also suitable for the electronic devices 205A, 205B, and 205C. In Steps 125A, 130, and 135, the automatic device pairing process can be arranged to respectively pair the dongle device 200 with the optical mouse device 205A, keyboard device 205B, and the touch pad device 205C automatically. Detailed description is not described for brevity.

Further, the storage circuit 2001 may have N registers which can be used for storing or recording device information of distinct electronic devices associated with the same or similar functions/operations. For example, the storage circuit 2001 can record device information of two optical mouse devices having the same functions. This can be adjusted or configured by a user. For instance, if the storage circuit 2001 totally has N registers, the user may configure M registers among the N registers as available registers. M is an integer equal to or smaller than N. That is, only the M registers are used, and the other registers are not used. The user may also configure two registers among the M registers to record device information of two distinct electronic devices having the same functions, e.g. two optical mouse devices. When checking that the content of at least one of the two registers is empty, the processing circuit 2002 is arranged to perform device pairing with neighboring optical mouse device(s) in the waiting state. If the contents of the two registers are full, the processing circuit 2002 does not perform device pairing with neighboring optical mouse device(s) even the dongle device 200 is in the waiting state. Similarly, this is also suitable for other different type electronic devices such as keyboard devices, touch pad devices, or others. Description is not detailed for brevity.

For configuring the number of available registers by the user, the user may employ the human-machine interactive interface 2101 to input the user's input and use the control device 2102 to activate an application or software at the host equipment device 210 to send a specific command or message via the USB port to configure the number of available registers of the dongle device 200. Further, if the host equipment device 210 is a testing equipment device at the factory, the host equipment device 210 can set/configure the dongle device via wireless and/or wired communications. USB communication between the host equipment device 210 and the dongle device 200 is not intended to be a limitation. Other modifications fall within the scope of the invention.

Additionally, the processing circuit 2002 of dongle device 200 may be arranged to determine when to control the dongle device 200 exit the waiting state. For example, the storage circuit 2001 has N registers, and the processing circuit 2002 can be arranged to configure or set a specific number of registers among the N registers for some particular applications such as wireless/wired speakers of multi-channel audio application or other applications of one dongle device mapping to multiple electronic devices. The processing circuit 2002 can be arranged to check content/information recorded by the specific number of registers to determine whether the content or information is not empty. If such content is not empty, the processing circuit 2002 can determine that the dongle device 200 has been paired with the speakers of multi-channel audio application or devices of other applications. In this situation, the processing circuit 2002 is arranged to control the dongle device 200 exit the waiting state automatically.

This automatic device pairing process is convenient for the user or operator to pair the dongle device 200 with a specific electronic device such as a mouse device, a keyboard device, a touch pad device, or other electronic devices at a factory. More specifically, it is more convenient for the user or operator to pair multiple dongle devices with corresponding multiple electronic devices respectively.

Figure 4:
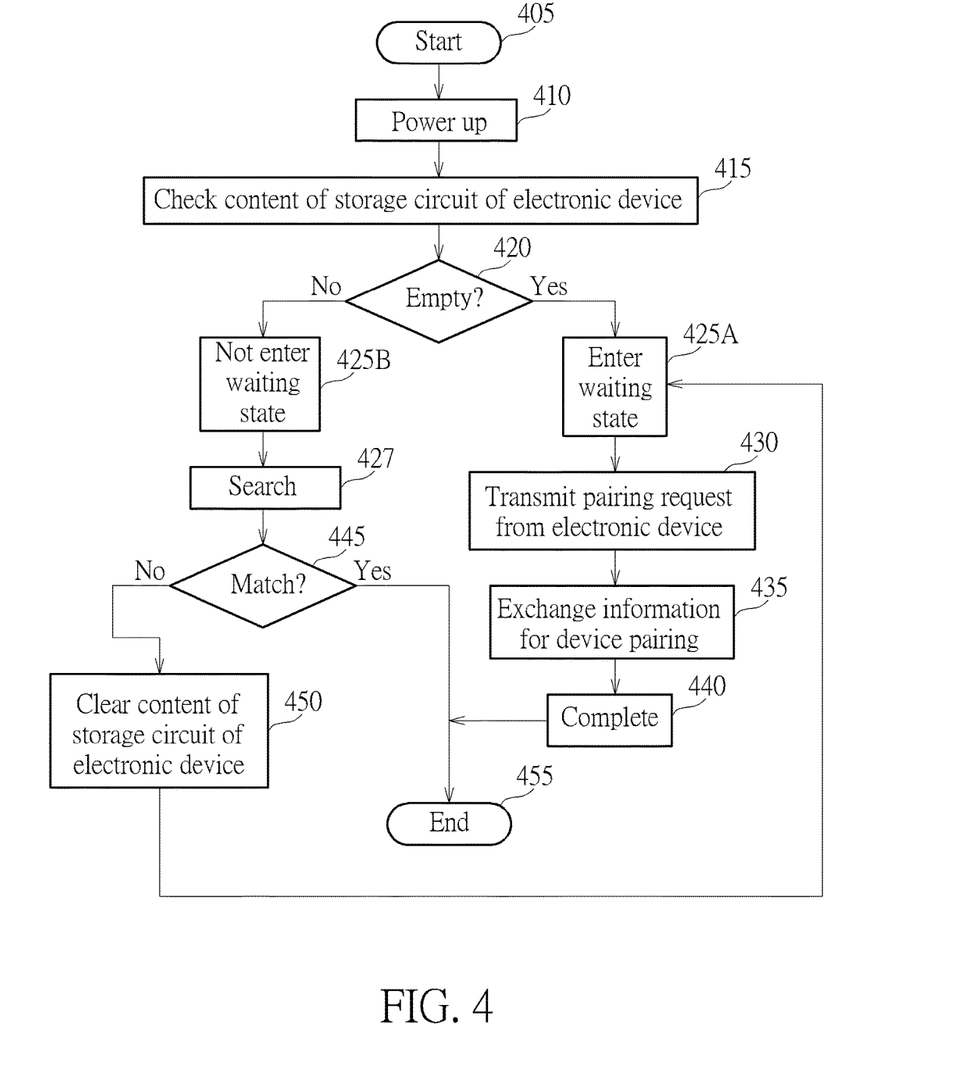
FIG. 4 is a flowchart diagram of the automatic device pairing process/method capable of controlling the dongle device and at least one electronic device to automatically enter the waiting state of device pairing according to a second embodiment of the invention.
Figure 5:
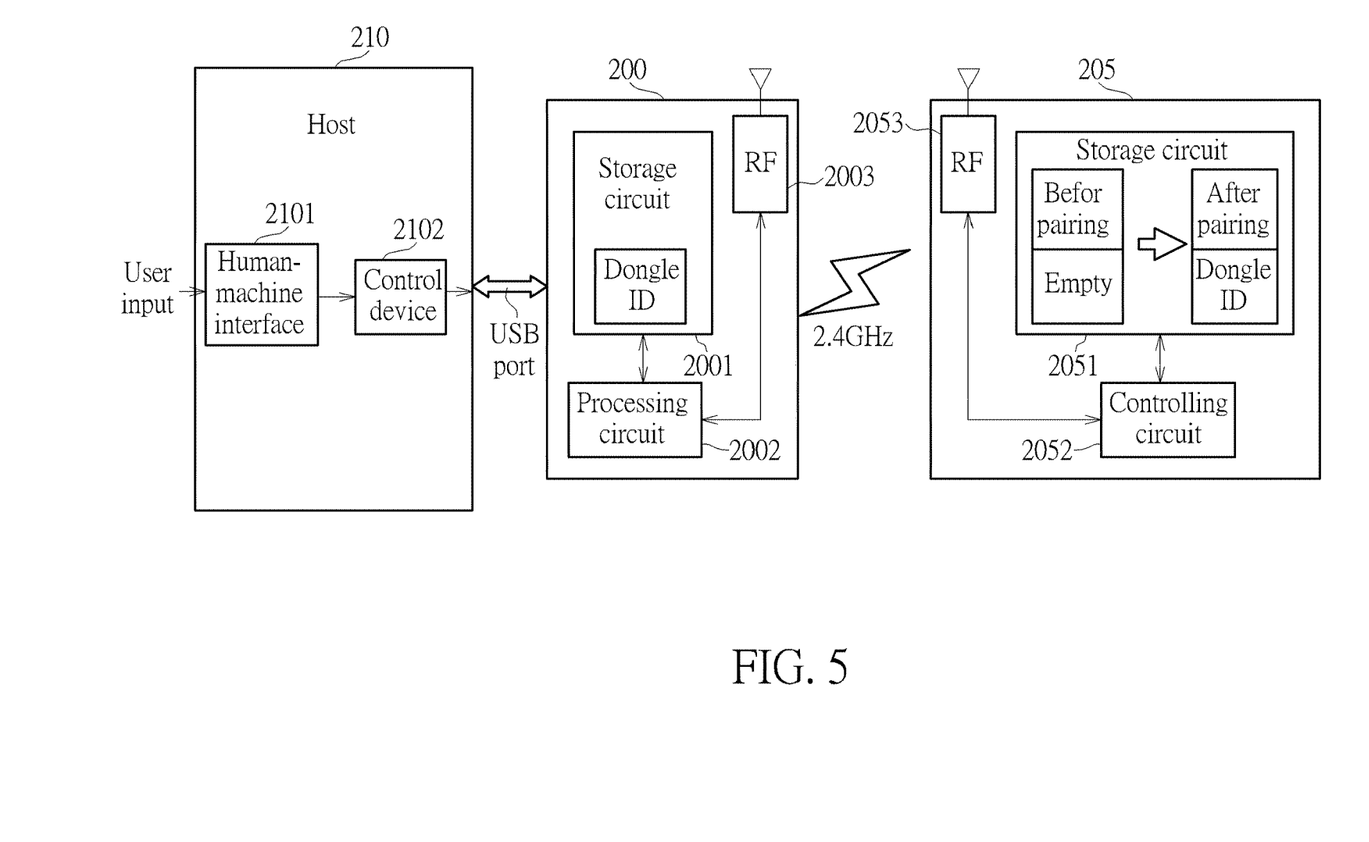
FIG. 5 is a block diagram of the dongle device and the electronic device(s) according to the second embodiment of FIG. 4.

In other embodiment, the pairing information exchanged/shared between paired devices may be device information (e.g. device ID) of a dongle device. Refer to FIG. 4 in conjunction with FIG. 5. FIG. 4 is a flowchart diagram of the automatic device pairing process/method for controlling the dongle device 200 and at least one electronic device 205 to automatically enter the waiting state of device pairing according to a second embodiment of the invention. FIG. 5 is a block diagram of the dongle device 200 and the electronic device(s) 205 according to the second embodiment of FIG. 4. In this embodiment, the storage circuit 2051 of electronic device 205 may have one or more registers which can be used for storing device ID information of the dongle device 200 if the dongle device has been paired with the device 205. For example, the storage circuit 2051 may have one register, and initially the content of register is empty.

Provided that substantially the same result is achieved, the steps of the flowchart shown in FIG. 4 need not be in the exact order shown and need not be contiguous, that is, other steps can be intermediate. Steps are detailed in the following:

Step 405: Start;

Step 410: Power up the dongle device 200 and electronic device 205;

Step 415: Use the electronic device 205 to check content of a storage circuit included within the electronic device 205 to generate a result such as a check resultant signal;

Step 420: Determine whether the check resultant signal indicates that the content is empty or not. If the content is empty, the flow proceeds to Step 425A, otherwise, the flow proceeds to Step 425B;

Step 425A: Control the electronic device 205 to enter the waiting state automatically;

Step 425B: Not control the electronic device 205 to enter the waiting state;

Step 427: Broadcast a generic information/message from the dongle device 200 to neighbor electronic device(s) to search for available neighbor electronic device(s) which will respond back unique message(s) in response to the generic message of the dongle device 200;

Step 430: Transmit a pairing request/message/packet from the electronic device 205 to the dongle device 200 to command the dongle device 200 to automatically enter the waiting state without activating an application or software to trigger the dongle device 200 to enter the waiting state;

Step 435: Control the dongle device 200 and electronic device 205 both in the waiting state of device pairing to exchange unique information/ID/key for device pairing;

Step 440: Complete device pairing;

Step 445: Determine whether any one responded unique message is matched with the information of content of the storage circuit; if the message is matched with the content information, the flow proceeds to Step 455, otherwise, the flow proceeds to Step 450;

Step 450: Clear the content of the storage circuit 2051; and

Step 455: End.

In Step 415, after the electronic device 205 is powered, the controlling circuit 2052 checks the contents of one or more registers included within the storage circuit 2051 to generate the check resultant signal. Before device pairing, the check resultant signal may indicate that the content of one register (or more registers) is empty. Then, the controlling circuit 2052 in Step 425A controls the electronic device 205 to enter the waiting state for device pairing. In Step 430, the controlling circuit 2052 controls the transceiver 2053 to transmit a pairing request/message/packet from the electronic device 205 to the dongle device 200 to command the dongle device 200 to automatically enter the waiting state without activating an application or software to trigger the dongle device 200 to enter the waiting state. In this embodiment, when the dongle device 200 is powered up in Step 410 and receives the pairing request/message/packet of Step 430, the processing circuit 2002 of dongle device 200 is arranged to respond the pairing request/message/packet by sending the unique device identification (ID) of dongle device 200, which is recorded by one register of storage circuit 2001, from the dongle device 200 to the electronic device 205 through the transceiver 2003 via the 2.4 GHz wireless communication. When the electronic device 205 receives such unique device ID, the storage circuit 2051 stores such information at a corresponding register. Thus, after exchanging/sharing the unique ID information, the device pairing process is automatically completed (Step 440). Later, the dongle device 200 and electronic device 205 can establish a security link/connection based on the exchanged pairing information/ID. In addition, the exchanged pairing information may be a particular/unique key generated or stored by the dongle device 200; this modification also falls within the scope of the invention.

Figure 6:
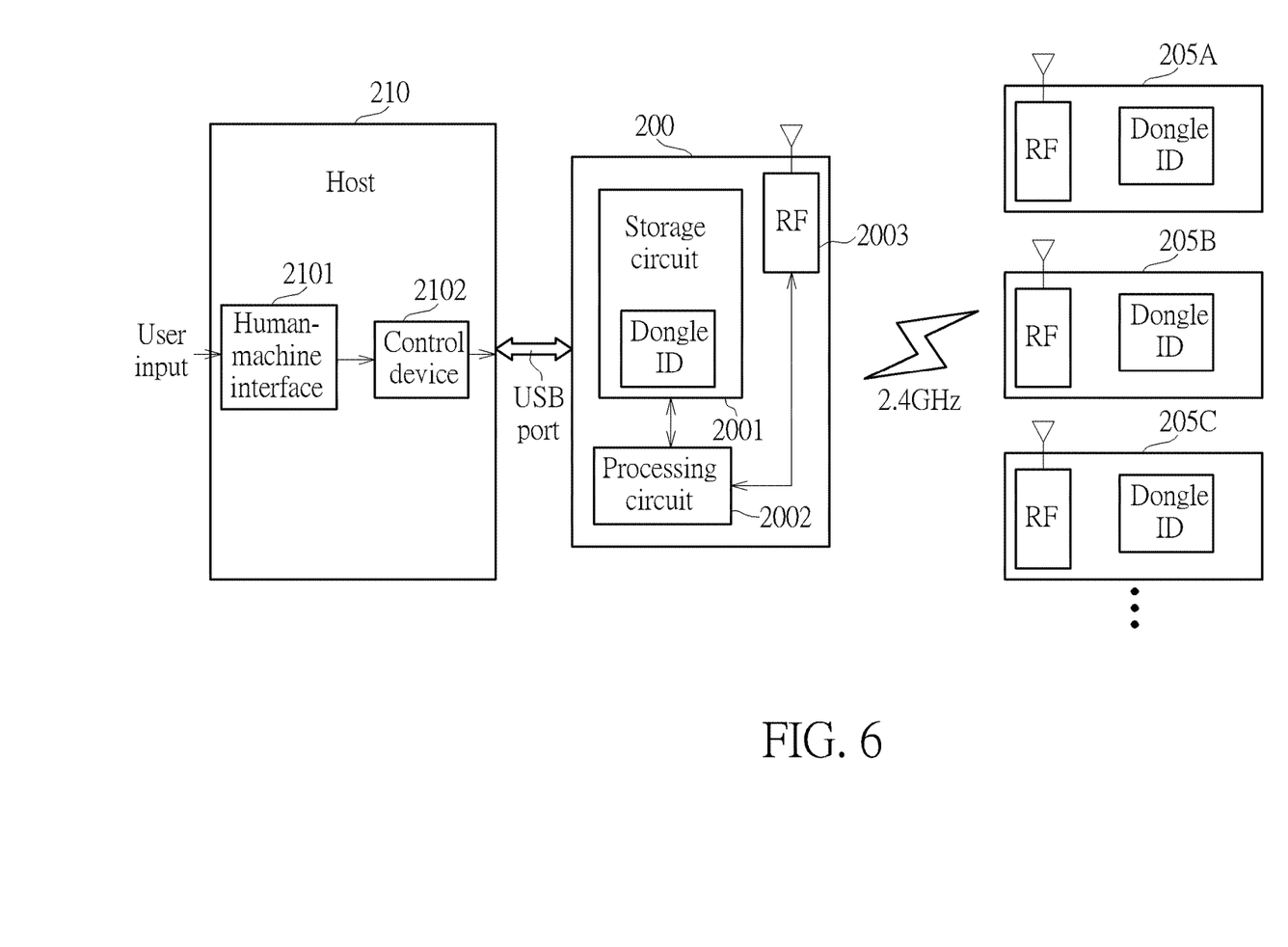
FIG. 6 is a block diagram of dongle device performing the automatic device pairing process with multiple electronic devices according to other embodiments of the invention.

In addition, in other embodiment, the dongle device 200 can be arranged to perform the automatic device pairing process with multiple electronic devices having the same, similar, or different functions/operations when the flow of FIG. 1 proceeds to Step 125A. Refer to FIG. 6, which is a block diagram of dongle device 200 performing the automatic device pairing process with multiple electronic devices such as 205A, 205B, and 205C. As shown in FIG. 6, for example, the electronic devices 205A, 205B, and 205C may be an optical mouse device, a keyboard device, and a touch pad device. Initially, the contents of registers of electronic devices 205A, 205B, and 205C are empty before device pairing, and the contents of the three registers after device pairing records dongle device ID information "dongle ID".

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a dongle device to enter a waiting state of device pairing to perform automatic device pairing, comprising:
   checking if a specific information of an electronic device is stored in a storage circuit before the electronic device communicates with the dongle device when the dongle device is powered up; and
   commanding the dongle device to directly transmit a pairing request to the electronic device before the electronic device communicates with the dongle device when the specific information is not stored in the storage circuit.

2. The method of claim 1, wherein the specific information is identification (ID) information of the at least one electronic device.

3. The method of claim 1, wherein the commanding step comprises:
   commanding the dongle device to directly transmit the pairing request to the electronic device when the at least one storage circuit is empty.

4. The method of claim 1, wherein the electronic device is used as a computer peripheral device corresponding to a computer, and the dongle device is used to be connected to a signal port of the computer.

5. The method of claim 1, wherein the storage circuit comprises at least one register used for recording the specific information.

6. The method of claim 1, further comprising:
   determining whether content recorded by a specific number of registers included within the storage circuit is not empty; and
   controlling the dongle device to exit the waiting state when the content is not empty.

7. The method of claim 1, wherein the pairing request is used to command the electronic device to automatically enter the waiting state.

8. A dongle device, comprising:
   a storage circuit; and
   a processing circuit, coupled to the storage circuit, configured for checking if a specific information of an electronic device is stored in the storage circuit before the electronic device communicates with the dongle device when the dongle device is powered up; and commanding the dongle device to directly transmit a pairing request to the electronic device before the electronic device communicates with the dongle device when the specific information is not stored in the storage circuit.

9. The dongle device of claim 8, wherein the specific information is ID information of the at least one electronic device.

10. The dongle device of claim 8, wherein the processing circuit is arranged for commanding the dongle device to directly transmit the pairing request to the electronic device when the at least one storage circuit is empty.

11. The dongle device of claim 8, wherein the electronic device is used as a computer peripheral device corresponding to a computer, and the dongle device is used to be connected to a signal port of the computer.

12. The dongle device of claim 8, wherein the storage circuit comprises at least one register used for recording the specific information.

13. The dongle device of claim 8, wherein the processing circuit is arranged to determine whether content recorded by a specific number of registers included within the storage circuit is not empty, and to control the dongle device to exit the waiting state when the content is not empty.

14. The dongle device of claim 8, wherein the pairing request is used to command the electronic device to automatically enter the waiting state.

15. A method for controlling an electronic device to enter a waiting state of device pairing, comprising:
   checking a storage circuit of the electronic device when the electronic device is powered up, the storage circuit of the electronic device being used for storing specific information of a dongle device which has been successfully paired with the electronic device;
   commanding the electronic device to directly enter the waiting state according to a result of checking the storage circuit before receiving a signal from the dongle device when the specific information is not stored in the storage circuit; and
   transmitting a pairing request from the electronic device to the dongle device according to the result of checking the storage circuit.

16. The method of claim 15, wherein the step of transmitting the pairing request comprises:

automatically transmitting the pairing request from the electronic device to the dongle device when the result indicates that information stored by the storage circuit of the electronic device is empty.

17. An electronic device, comprising:
a storage circuit; and
a controlling circuit, coupled to the storage circuit, configured for checking the storage circuit when the electronic device is powered up, and for controlling the electronic device to directly enter the waiting state according to a result of checking the storage circuit before receiving a signal from a dongle device when the specific information is not stored in the storage circuit, and in the waiting state for transmitting a pairing request from the electronic device to the dongle device;
wherein the storage circuit is used for storing specific information of a dongle device which has been successfully paired with the electronic device.

18. The electronic device of claim 17, wherein the controlling circuit is configured for automatically controlling transmission of the pairing request from the electronic device to the dongle device when the result indicates that information stored by the storage circuit is empty.

* * * * *